United States Patent [19]
Milatz
[11] Patent Number: 4,942,464
[45] Date of Patent: Jul. 17, 1990

[54] SURVEILLANCE DEVICE FOR THE PROTECTION OF AN AUTOMATIC DELIVERY APPARATUS

[76] Inventor: Erhard Milatz, Johann-Sebastian-Bachstrasse 74, 4019 Monheim, Fed. Rep. of Germany

[21] Appl. No.: 321,564
[22] Filed: Mar. 9, 1989

[30] Foreign Application Priority Data
Mar. 9, 1988 [DE] Fed. Rep. of Germany ....... 3807727

[51] Int. Cl.[5] .......... H04N 7/18
[52] U.S. Cl. .......... 358/108; 902/6; 340/541
[58] Field of Search .......... 358/108, 245, 93; 346/107 C; 235/379; 902/1, 6; 340/673, 676, 691, 541, 540, 554; 307/125, 134, 142

[56] References Cited

U.S. PATENT DOCUMENTS 4,245,902 1/1981 Cataldo et al. .......... 346/107 C
4,417,278 11/1983 Hensleigh et al. .......... 358/245
4,420,751 12/1983 Paganini et al. .......... 902/1
4,524,268 6/1985 Fukatsu .......... 235/379
4,795,889 1/1989 Matuura et al. .......... 235/379
4,866,423 9/1989 Anderson, II et al. .......... 340/541

FOREIGN PATENT DOCUMENTS 0215883 12/1983 Japan .......... 346/107 C
0104877 6/1984 Japan .......... 358/108

*Primary Examiner*—James J. Groody
*Assistant Examiner*—James Juo
*Attorney, Agent, or Firm*—Lee, Mann, Smith, McWilliams & Sweeney

[57] ABSTRACT

A surveillance device for the protection of an automatic delivery apparatus operable by code carriers, in particular of a money dispenser, has a video camera (12), which is arranged to be triggered responsive to actuation of the automatic delivery apparatus (10), and which takes and stores a picture of a field of view (14) within which a user has to be, when actuating the automatic delivery apparatus. A sensor (16) responds to the presence of objects within a forbidden zone comprising a region adjacent to the video camera. The automatic delivery apparatus is blocked, when the sensor (16) responds to an object.

4 Claims, 2 Drawing Sheets

SURVEILLANCE DEVICE FOR THE PROTECTION OF AN AUTOMATIC DELIVERY APPARATUS

The invention relates to a surveillance device for the protection of an automatic delivery apparatus, which is operable by code carriers, in particular of a money dispenser.

In order to provide bank customers with cash money, in particular outside the office hours of the bank, money dispensers have been installed. A check card having a magnetically coded strip is inserted with this strip into this money dispenser. After a "personal secret number" has been input by means of a keyboard of the money dispenser, an amount of money also input by means of the keyboard can be taken from the money dispenser.

When the check card has been stolen or lost, there is the risk of misuse. Often the "personal secret number" is wormed out of the lawful owner by a trick or has become known to the thief or finder in some other way. This person is then able to draw money from a money dispenser to the owner's account.

Similar problems can arise with other automatic delivery devices which are operable by the magnetic code of a check or credit card, for example with vending machines for selling airline tickets.

It is the object of the invention to protect such apparatus from misuse.

According to the invention this object is achieved by (a) a picture recording device, which is arranged to be triggered responsive to actuation of said automatic delivery apparatus, and which takes and stores a picture of a field of view within which a user has to be, when actuating said automatic delivery apparatus, (b) sensor means, which respond to the presence of objects within a forbidden zone comprising a region adjacent to said picture recording device, and (c) means for blocking said automatic delivery apparatus, when said sensor means respond to such object.

Each user is recorded by a picture recording device, when he actuates the automatic delivery apparatus. Preferably, the picture recording device is a video camera. A video camera operates sufficiently, even with very dim illumination, and can be made very small. In addition, it is possible to erase the recorded pictures after some time, if no misuse of the automatic delivery apparatus has been detected. In this way the users of the automatic delivery apparatus are recorded, whereby in the case of unauthorized use at least a recorded picture of the user is available. A user who uses the automatic delivery apparatus illegally could try to prevent the recordal of the picture by covering the picture recording device. Then, however, the sensor means would respond and block the automatic delivery apparatus.

Modifications of the invention are claimed in dependent claims.

An embodiment of the invention is described in greater detail hereinbelow with reference to the accompanying drawings.

Numeral 10 designates a money dispenser from which, after insertion of a check card and input of a code, amounts of money can be taken. This money dispenser is watched by a built-in video camera 12. The video camera detects a field of view 14, within which the head of the user has to be, when the user operates the money dispenser. By actuation of the money dispenser by means of a check card, the video camera is triggered and records a picture of the user.

Figure 1:
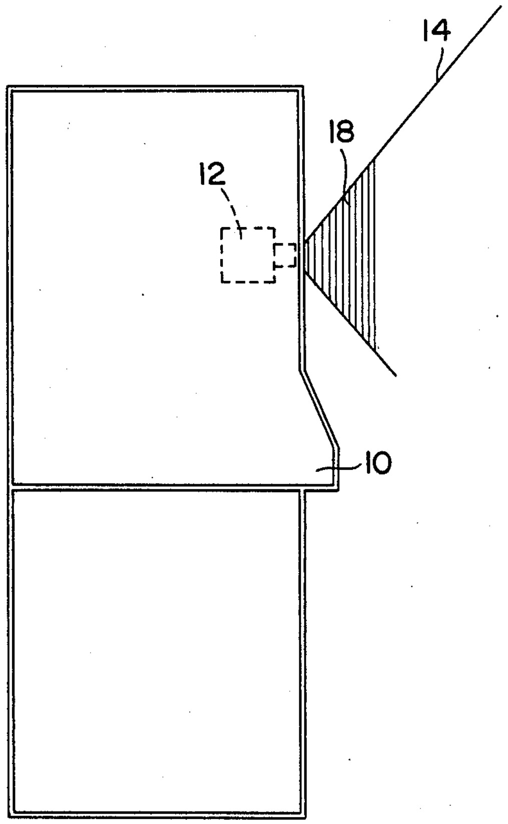
FIG. 1 illustrates schematically a money dispenser with a surveillance device.

A sensor 16 (not shown in FIG. 1) responds, when objects are located in a region 18 adjacent the video camera 12. This sensor serves to interrupt the function of the money dispenser 10. The money dispenser then does not deliver any money.

Figure 2:
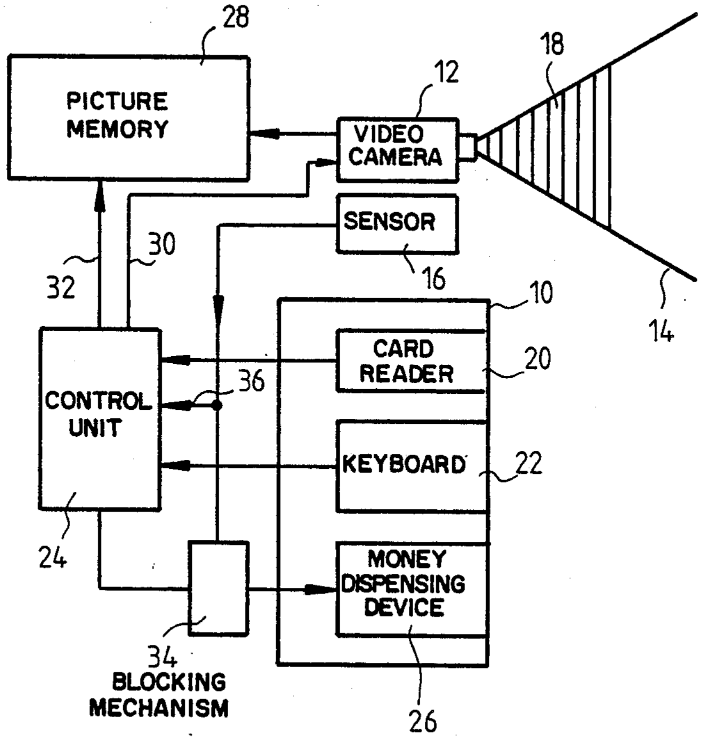
FIG. 2 is a schematic block diagram of the money dispenser and of the surveillance device.

The operation of the money dispenser and of the surveillance device is schematically illustrated in FIG. 2 in the form of a block diagram.

The money dispenser incorporates a card reader 20. The magnetic strip of the check card with the magnetic code is inserted into this card reader 20. A code, the "personal secret number" is input by means of a keyboard 22. The keyboard also serves to input the desired amount of money, after the check card and code have been examined. The examination is carried out in a control unit 24. The control unit 24 controls the money dispensing device 26.

The video camera is connected with a picture memory 28. The picture memory may be a video tape. However the picture memory can also be arranged to store still pictures. The video camera 12 is arranged to be switched on by the control unit 24, as soon as the money dispenser 10 is actuated by a check card. This is indicated by line 30. Furthermore, the control unit 24 supplies data to the picture memory 28, as indicated by line 32. These data are stored unambiguously associated with the stored picture. These data, for example, comprise the check card number and the date and time, when the money dispenser has been actuated. Also a running number of the event can be stored with the stored picture, this number, in turn, being stored unambiguously associated with the data mentioned.

The sensor 16 responds, when an object is located within the region 18 and thereby covers the field of view 14 of the picture recording device, i.e. video camera 12. This sensor may be an automatic range finder. The sensor 16 can be an integral part of the video camera 12. The sensor 16 controls a blocking mechanism 34, which interrupts the dispensing of money by the money dispensing device 26. The money dispensing procedure is terminated by a signal through line 36.

The region 18 is selected such that the user during normal operation of the money dispenser 10 need not reach into this region 18. On the other hand, the region 18 is selected such that it is necessary to reach into this region, if the field of view is to be covered inconspiciously.

In operation, the record is checked in certain intervals to determine, whether there has been a case of misuse, whether, for example, a check card number is identical with the number of a check card reported to be stolen. In this case, a picture of the user can be obtained. If there is no case of misuse, the stored pictures can easily be erased.

I claim:

1. A surveillance device for the protection of an automatic delivery apparatus operable by code carriers, characterized by (a) a picture recording device (12), which is arranged to be triggered responsive to actuation of said automatic delivery apparatus (10), and which takes and stores a picture of a field of view (14) within which a user has to be, when actuating said automatic delivery apparatus, (b) sensor means (16), which respond to the presence of objects within a forbidden zone comprising a region adjacent to said picture recording device, and (c) means (34,36) for blocking said automatic delivery apparatus (10), when said sensor means respond to such object.

2. A surveillance device as claimed in claim 1, wherein said picture recording device is a video camera.

3. A surveillance device as claimed in claim 1, wherein said sensor means comprise an automatic range finder.

4. A surveillance device as claimed in claim 1, and further comprising means (28,32) for recording data of said code carrier, said data being recorded unambiguously associated with said recorded pictures.

* * * * *